United States Patent
Vangala et al.

(10) Patent No.: US 10,242,672 B2
(45) Date of Patent: Mar. 26, 2019

(54) INTELLIGENT ASSISTANCE IN PRESENTATIONS

(71) Applicant: Microsoft Technology Licensing, LLC., Redmond, WA (US)

(72) Inventors: Vipindeep Vangala, Hyderabad (IN); Rajesh Gunda, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/338,275

(22) Filed: Oct. 28, 2016

(65) Prior Publication Data
US 2018/0122371 A1    May 3, 2018

(51) Int. Cl.
| | |
|---|---|
| *G10L 15/22* | (2006.01) |
| *G06F 17/24* | (2006.01) |
| *G06F 17/27* | (2006.01) |
| *G10L 25/63* | (2013.01) |
| *G10L 25/90* | (2013.01) |
| *G10L 15/08* | (2006.01) |
| *G10L 15/06* | (2013.01) |

(52) U.S. Cl.
CPC ............ *G10L 15/22* (2013.01); *G06F 17/241* (2013.01); *G06F 17/278* (2013.01); *G10L 25/63* (2013.01); *G10L 25/90* (2013.01); *G10L 2015/0635* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | |
|---|---|---|
| 6,580,438 B1 | 6/2003 | Ichimura et al. |
| 7,050,978 B2 | 5/2006 | Silverstein et al. |
| 7,401,068 B2 | 7/2008 | Kelley et al. |
| 7,549,120 B1 | 6/2009 | Griffith et al. |
| 7,607,089 B2 | 10/2009 | Baker et al. |
| 8,171,412 B2 | 5/2012 | Sand et al. |
| 8,386,929 B2 | 2/2013 | Zaika et al. |
| 8,689,097 B2 | 4/2014 | Varadarajan et al. |
| 8,756,057 B2 | 6/2014 | Miller et al. |
| 8,775,918 B2 | 7/2014 | Livshin et al. |

(Continued)

OTHER PUBLICATIONS

Catanzariti, Patrick, "How to Build Your Own AI Assistant Using Api.ai", Published on: Jan. 11, 2016 Available at: https://www.sitepoint.com/how-to-build-your-own-ai-assistant-using-api-ai/.

*Primary Examiner* — Abul K Azad
(74) *Attorney, Agent, or Firm* — Merchant & Gould P.C.

(57) ABSTRACT

An intelligent assistant leverages private data specific to users and data available publically on one or more networks to improve the functionality of devices used to present content. A user's actions in a content authoring application are observed by the intelligent assistant and used to predict the user's actions. The public data related to the content in the presentation are also used to augment the presentation and to suggest best practices in presenting the content. In some aspects, a "practice" presentation is given by the user to provide the intelligent assistant a baseline to which to assist the user in realtime comply with during a "live" presentation or to receive suggestions in how to improve the presentation prior to presenting it "live".

22 Claims, 9 Drawing Sheets

(56) References Cited

U.S. PATENT DOCUMENTS

| | | | |
|---|---|---|---|
| 8,949,254 B1* | 2/2015 | De Datta | G06F 17/30011 |
| | | | 707/751 |
| 9,026,915 B1 | 5/2015 | Ehlen et al. | |
| 2006/0075348 A1* | 4/2006 | Xu | G06F 3/0481 |
| | | | 715/730 |
| 2008/0320396 A1* | 12/2008 | Mizrachi | G06F 3/0485 |
| | | | 715/744 |
| 2012/0296638 A1 | 11/2012 | Patwa | |
| 2013/0041661 A1* | 2/2013 | Lee | G10L 15/26 |
| | | | 704/235 |
| 2014/0380171 A1 | 12/2014 | Maloney et al. | |
| 2015/0088496 A1* | 3/2015 | Harada | G10L 15/26 |
| | | | 704/210 |
| 2016/0170968 A1* | 6/2016 | Allen | G06F 17/2765 |
| | | | 434/322 |
| 2017/0084295 A1* | 3/2017 | Tsiartas | G10L 25/63 |

* cited by examiner

INTELLIGENT ASSISTANCE IN PRESENTATIONS

BACKGROUND

Creators and presenters of presentation documents, such as slideshow presentations, reports, note files, etc., are faced with balancing several aspects of their documents to keep the audience engaged, and to effectively communicate the content of the documents. The level of detail included on the documents, the layout of the documents, and a speed at which to present the material are all crucial to effective communication with a document presentation. To improve a presentation, creators and presenters rely on human feedback to determine on a how effective a presentation is. However, depending on the peer group available to the creators and presenters, that feedback may be flawed (e.g., bad advice) or incomplete (e.g., from ill-informed experts), and the presentation may suffer as a result of the creators and presenters iterating on flawed human feedback.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems and methods are provided herein to provide intelligent assistance in designing and deploying presentations. Such systems and methods may be integrated into existing software as a module, plugin, extension, etc. Example presentation software includes, but is not limited to: slideshow presentation software, word processing software, note taking software, spreadsheet software, suites of such software, etc., in which a user may author and present content.

The intelligent assistant uses world knowledge and machine learning to expand the peer group available to a user (creator or presenter) and tailor the recommendations on a given presentation document to the user. The intelligent assistant provides analytics to the user on the verbosity, progression of content, time to present content, classification of content, layout of content, speech analysis of the presentation (e.g., speed, emotion, nervous tics), etc. World knowledge is also drawn upon to augment the content of the presentation with additional information and/or references. As the user employs the intelligent assistant, the user's reactions to the analytics are recorded and analyzed according to machine learning principals to identify a preferred style for the user or areas of improvement for the user, which will differ from those of other users.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
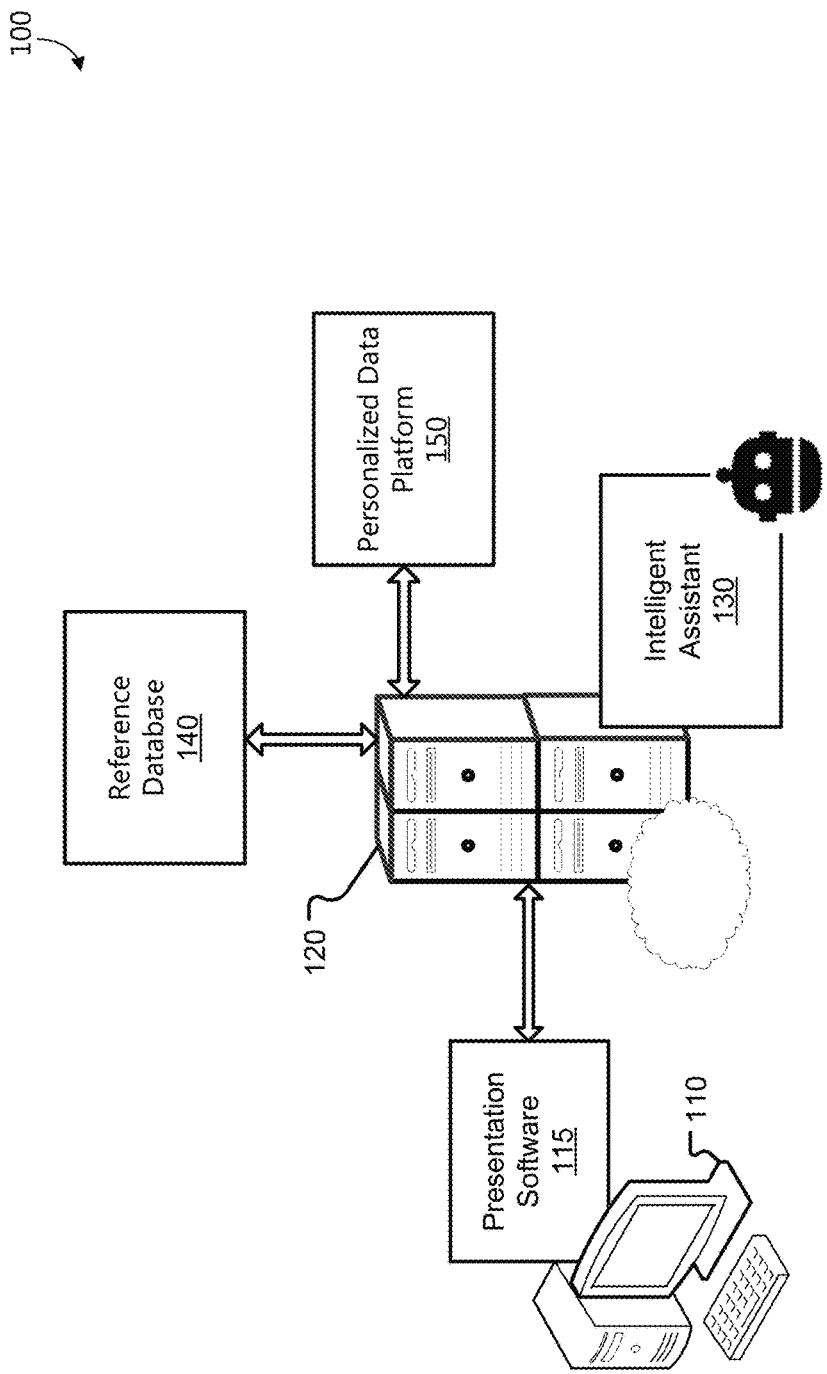
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems and methods are provided herein to provide intelligent assistance in designing and deploying presentations. Such systems and methods may be integrated into existing presentation software as a module, plugin, extension, etc. Example presentation software includes, but is not limited to: slideshow presentation software, word processing software, note taking software, spreadsheet software, suites of such software, etc., in which a user may author and present content.

The intelligent assistant uses world knowledge and machine learning to expand the peer group available to a user (creator or presenter) and tailor the recommendations on a given presentation document to the user. The intelligent assistant provides analytics to the user on the verbosity, progression of content, time to present content, classification of content, layout of content, speech analysis of the presentation (e.g., speed, emotion, nervous tics), etc. World knowledge is also drawn upon to augment the content of the presentation with additional information and/or references. As the user employs the intelligent assistant, the user's reactions to the analytics are recorded and analyzed according to machine learning principals to identify a preferred style for the user or areas of improvement for the user, which will differ from those of other users.

FIG. 1 illustrates an example environment 100 in which the present disclosure may be practiced. As illustrated, a client device 110 is running an instance of presentation software 115, which communicates with an assistant server 120 to send and receive data and analytics related to presentation documents. The assistant server 120 is in communication with the intelligent assistant 130 to communicate aspects of a presentation document accessible by the presentation software 115 to the intelligent assistant 130. The intelligent assistant 130 receives these aspects of the presentation and consults with a reference database 140 and personalized data platform 150 to provide analytics on the presentation, which are returned to the client device 110 for display within the presentation software 115 and/or to modify the presentation.

While the client device 110, assistant server 120, intelligent assistant 130, the reference database 140, and personalized data platform 150 are shown remotely from one another for illustrative purposes, it should be noted that the intelligent assistant 130 is suitable for several configurations including, without limitation: a separate system hosted by the assistant server 120, an integral aspect of the presentation software 115, or as an interface of the reference database 140 or personalized data platform 150. Various servers and intermediaries familiar to those of ordinary skill in the art may lie between the component systems illustrated in FIG. 1 to route the communications between those systems, which are not illustrated so as not to distract from the novel aspects of the present disclosure.

The client device 110 and the assistant server 120 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, printers, and mainframe computers. The hardware of these computing systems is discussed in greater detail in regard to FIGS. 5-7.

In various aspects, the presentation software 115 may be run locally on the client device 110 or as an instance of a thin client that accesses an online presentation software service via a web browser. Examples of presentation software 115 include, but are not limited to: POWERPOINT® (available from Microsoft Corp. of Redmond, Wash.), KEYNOTE® (available from Apple, Inc. of Cupertino, Calif.), IMPRESS® (available from The Apache Software Fnd., of Forest Hill, Md.), and GOGGLE® SLIDES (available from Alphabet, Inc. of Mountain View, Calif.). Additional examples of presentation software 115 include: the WORD® word processor, the ONENOTE® note taking application, and the EXCEL® spreadsheet application, and the OFFICE365® suite of online authoring applications (all available from Microsoft Corp.); the WRITER' word processor, and the CALC™ spreadsheet application (available from The Apache Software End.); the GOOGLE® DOCS suite of online authoring applications (available from Alphabet, Inc.), etc. The presentation software 115 includes productivity suites and their component authoring applications, as well as standalone software packages.

As a user authors a presentation, or practices the presentation, the user may invoke the intelligent assistant 130 to provide feedback, incorporate notes, locate external references, and make suggested changes to the presentation. The intelligent assistant 130 analyzes the data related to the presentation and communicates with the reference database 140 and personalized data platform 150 to supplement those data and provide feedback to the user. For example, the intelligent assistant 130 receives audio data of the user practicing the presentation from a microphone of the client device 110 and converts the audio data into text via a speech recognition module stored in the personalized data platform 150 that is adapted to the user (e.g., historical data of the user's accent and pace to affect the text output of the conversion). In some aspects, the text from the converted audio data is available in a "karaoke" mode, where it is presented to the user (at the rate it was given, or adjusted to meet a desired words-per-minute rate) to review and practice with, is incorporated into a notes section of the presentation document, or is recorded in a separate document as a transcript. In another example, the intelligent assistant parses the text of the presentation document to identify entities that additional information is retrieved for via the reference database 140.

The reference database 140 is a persistent store that provides access to world knowledge, publically available data, and aggregations of data from multiple personalized data platforms 150. In some aspects, the reference database 140 is a network that has been crawled by a search engine, or a graph database of that network. In various aspects, the intelligent assistant 130 interfaces with a search engine to provide top-ranked results from a network or graph database in response to requests for additional content with which to augment the presentation document. The reference database 140 provides additional content via hyperlinks for content, suggestions for commands, design-choice best practices (e.g., not to use text of color x on a background of color y, use at least text of size z, an appropriate words-per-minute range for presenting a document).

The personalized data platform 150 is a persistent store that allows the user's preference and authoring style to be learned over time for use by the intelligent assistant 130. Historical user interactions with the intelligent assistant 130 and prior documents authored by the user (or the metadata therefore) are stored by the personalized data platform 150 and used in conjunction with machine learning algorithms to determine user preferences. For example, if the prior actions (or documents) indicate that the user switches the default typeface to a second typeface (e.g., Calibri to Courier), the intelligent assistant 130 is operable to automatically change the typeface in the document, or suggest a typeface change to the user as an authoring action. In another example, the average rate of the user's speech (e.g., 120, 160, 180 words per minute), speech patterns (e.g., regional accent), and vocabulary preferences (e.g., terms specific to the user's field of endeavor to use/avoid using, choice of language/dialect) are recorded to aid in converting speech to text more accurately for the given user.

Additionally, the personal data platform 150 is operable to provide playback of recorded "practice" or "live" runs of various presentations for self-critique or playback to other persons. When the presentation document includes distinct segments (e.g., pages, paragraphs, slides, spreadsheets), the intelligent assistant 130 is operable to retrieve the playbacks for individual segments. For example, when presenting a slide deck as a practice run and capturing speech data for analysis, the intelligent assistant 130 may associate the speech data with the displayed slide while the user is presenting, and playback the audio of the speech data associated with a given slide when that slide is displayed during post-presentation review.

Figure 2:
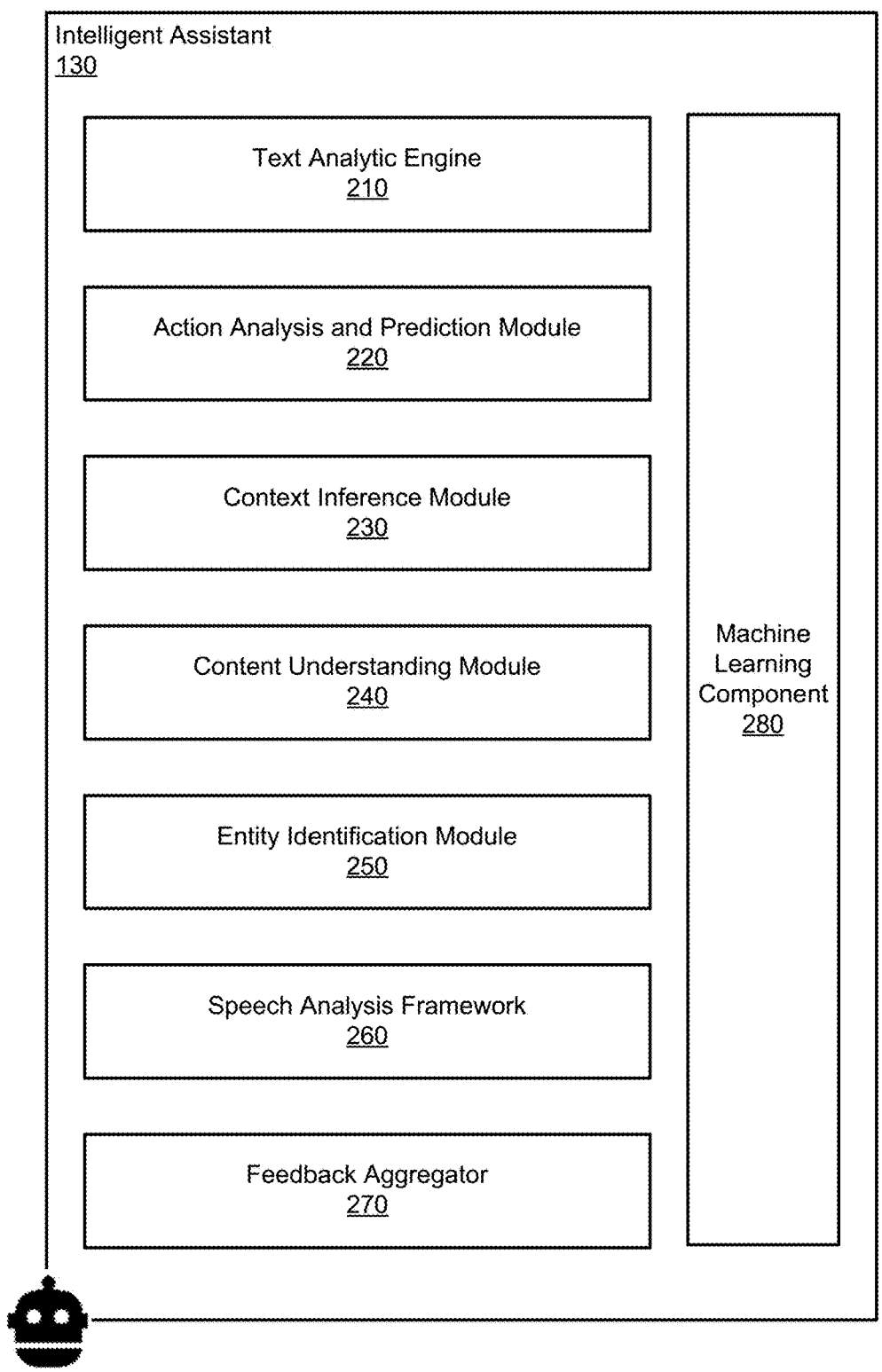
FIG. 2 illustrates several example modules of an intelligent assistant.

In various aspects, the intelligent assistant 130 is made of one or more modules that may be upgraded, substituted, activated, or enabled/disabled individually to affect the performance and the operability of the intelligent assistant 130. FIG. 2 illustrates several such modules, which may be activated or disabled by a user according to user preferences and available bandwidth.

One such module is a text analytic engine 210, which enables the intelligent assistant 130 to parse and analyze textual content from the presentation document. For example, the textual content of the presentation is analyzed to determine whether portions of the presentation are too sparse or too verbose in the amount of textual content they contain (i.e., the verbosity of a given segment or comparative verbosity of segments). In another example, the textual content is parsed to provide other modules with relevant key words (e.g., discarding various conjunctions, prepositions, articles).

A second such module is an action analysis and prediction module 220, which enables the intelligent assistant to analyze the actions that the user is taking in the presentation software 115 while authoring the presentation to predict desired actions and implement those actions proactively in the presentation software 115. For example, if the action analysis and prediction module 220 receives a user action of creating a text box, prior user actions from the personalized data platform 150 are accessed to determine formatting actions that the user is likely to make (e.g., a preferred background color, typeface, etc.), and the intelligent assistant 130 will proactively take those actions in the presentation software 115 without requiring further user interaction.

A third such module is a context inference module 230, which enables the intelligent assistant 130 to add additional context to entities and terms identified in the presentation to distinguish concepts present in the present from similarly labeled terms/concepts based on contextual data in the presentation. For example, if the word "unionized" is present in the textual content, the context inference module 230 is operable to determine, based on other data in the presentation or the personal data platform 150, whether the term relates to labor unions (union-ized) or chemical compounds that are not ionized (un-ionized).

A fourth such module is a content understanding module 240, which enables the intelligent assistant 130 to classify and cluster content in the presentation for use with a context inference module 230 or with best practices in design choices from the reference database 140. For example, an image in the presentation may be analyzed by the content understanding module 240 relative to the textual content of a presentation document to determine whether the content items are related. The content understanding module 240 may examine distances between content objects on a document canvas, perform Optical Character Recognition (OCR) on content items to provide additional textual content, analyze metadata for objects (e.g., time added to presentation, handles/flags, z-order) to determine how the content should be understood in the presentation. In various aspects, the context inference module 230 operates in conjunction with a content understanding module 240 to cluster and classify content in the presentation.

A fifth such module is an entity identification module 250, which enables the intelligent assistant 130 to parse through records received from the reference database 140 to return relevant results to augment the presentation. For example, an entity of interest is recognized in the text of the presentation, such as, for example, the United States Patent and Trademark Office, and that entity is searched for in the reference database 140, and the entity identification module 250 is operable to return the most relevant results on the entity for the user in the given presentation. In various aspects, the entity identification module 250 is part of, or an interface to, a graph database, such as, for example, SATORI™ or KNOWLEDGE GRAPH™ (available from Microsoft Corp. and Alphabet, Inc., respectively).

A sixth such module is a speech analysis framework 260, which enables the intelligent assistant 130 to interpret audio data of the user's speech and convert it into a converted set of text. The converted text may be provided to the other modules for further analysis or provided for inclusion back into the presentation as notes or a transcript in a new document. The speech analysis framework 260 is operable to communicate with a personal data platform 150 to retrieve the user's speech patterns (e.g., language of choice, preferred vocabulary terms, accent data) to better convert the audio data into text. The speech analysis framework 260 is further operable to analyze speech patterns of the current audio data against speech patterns in historic data stored in the personal data platform 150 to provide analysis of the user's current presentation style. For example, the volume of the current speech data may be compared to one or more prior sets of speech data (separately or in aggregate) to determine whether the user is too loud, too quiet, fading in and out, etc. In various aspects, the speech analysis framework 260 is further operable to accept biometric data (e.g., heartrate) to determine an emotional state of the user (e.g., nervous, calm, excited) uttering the speech data in conjunction with the pitch and rate of speech in the speech data. The speech analysis framework 260 is also operable to accept video data to identify facial expressions, eye contact with the audience, posture, and animation of the user (e.g., fidgeting, gesticulation, pacing). In yet additional aspects, the speech analysis framework 260 is operable to identify words or actions that the user has set as undesirable, such as, for example, putting ones hands in ones pockets (from video data), verbal tics (e.g., in English: "um", "uh", "like", "you know"), long pauses, etc. The speech analysis framework 260 is operable to accept a desired words-per-minute rate for the presentation, which may be set by a "practice" run of the presentation and determine when the user is deviating from that speech rate (e.g., speeding up, slowing down, etc.).

A seventh such module is a feedback aggregator 270, which enables the intelligent assistant 130 to receive the outputs from the other modules and provide a meaningful abstraction and a schema for any textual feedback that the presentation software 115 can receive and implement for the user. In a first example, text converted from audio data by the speech analysis framework 260 may be formatted for insertion as text into a notes section of one or more segments of the presentation document. In a second example, an action predicted by the action analysis and prediction module 220 is formatted as a command to execute in the presentation software 115. In a third example, an alert or status message is generated for display on a presenter view (not the audience view) of the presentation software 115 when the speech analysis framework 260 has determined that the presenter is talking too fast/slow/loud/quiet.

The decisions made by the various modules are influenced by a machine learning component 280 to improve the feedback provided to the user based on the user's acceptance or rejection of that feedback over time. The machine learning component is further operable to perform datamining and statistical calculations on the personal data platform 150 and reference database 140 to determine the best feedback to provide to the user. For example, the machine learning component 280 may examine the presentation documents in the personal data platform 150 to determine a favorite typeface for the user. In another example, the machine learning component 280 may examine the presentation documents in the reference database 140 to determine a typeface preferred by an aggregation of users or other design best practices (e.g., element spacing, coloring, font sizes).

The intelligent assistant 130 is operable to provide feedback to the user in realtime. The various modules accept inputs as the user authors, performs a "practice" run, or a "live" run of the presentation, and provide their outputs accordingly in realtime. For example, when a user is authoring the presentation, the intelligent assistant 130 may provide predicted commands proactively, but will not provide commands during a presentation (practice or live). In another example, an intelligent assistant 130 records speech as text for insertion as notes into the presentation file during a practice run, but records speech as text as a transcript in a separate document during a live run.

Figure 3:
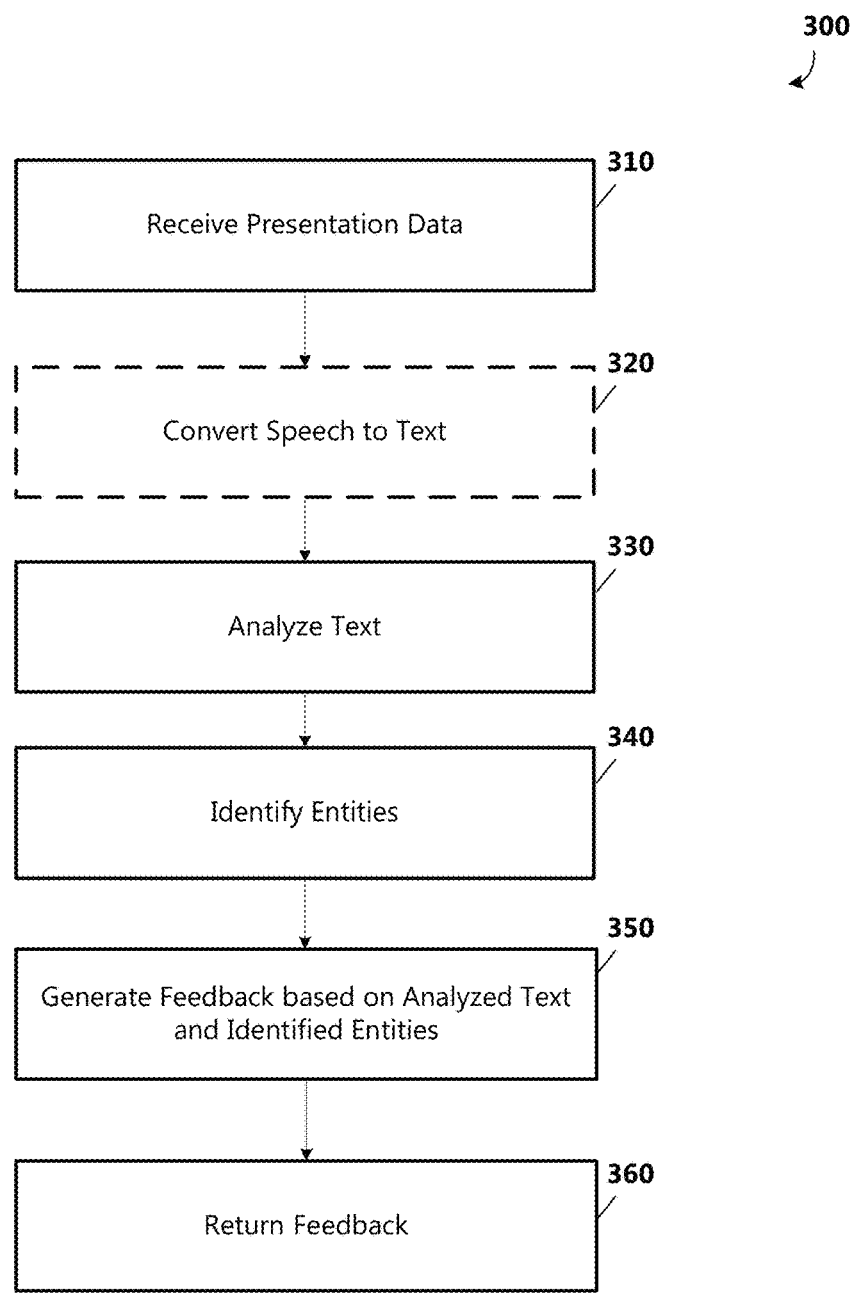
FIG. 3 is a flow chart showing general stages involved in an example method for providing personalized assistance in a productivity suite or application.

FIG. 3 is a flow chart showing general stages involved in an example method 300 for providing personalized assistance in a productivity suite or application. Method 300 uses world knowledge and personalized voice analytics to assist a user in authoring a presentation document, and may be invoked by the user (e.g., hitting an "ask for feedback" button) or invoked automatically as the user authors or practices the presentation document. Once invoked, method 300 proceeds to OPERATION 310, where presentation data are received. In some aspects, the presentation data include one or more segments of the presentation (e.g., one slide, page, spreadsheet), textual content, non-textual content, audio data when presenting, and/or video data when presenting.

When data including speech data (audio and/or video data) are received at OPERATION 310, method 300 proceeds to OPERATION 320 to convert speech to text. In various aspects, the speech is converted to text based on the user's previous speech patterns so that the text is personalized to the user, which provides greater accuracy, and requires less user input to correct inaccuracies. For example, specific terms or turns of phrase particular to the given user may be learned via a machine learning framework to consistently provide a user with accurate conversions that account for the user's language, accent, rate of speech, and historic vocabulary choices. In various aspects, speech data are associated with a given segment of the presentation document displayed while those data are received.

At OPERATION 330, the intelligent assistant 130 analyzes the textual content, including any converted text, to identify metrics related to the textual content. For example, the intelligent assistant 130 may return metrics related to the verbosity of the presentation document or a segment thereof, an amount of time spent per segment according to a presentation run, a word-per-minute rate at which the presentation was given in a prior run, a design-choice best practice (e.g., percentage whitespace between elements, number of colors, contrasts of colors), etc.

At OPERATION 340, entities are identified from the textual content. In various aspects, as a first entity may share a name with a second entity (e.g., there may be several persons referred to as "John Doe"), and the intelligent assistant 130 will determine an inferred identity based on context in the textual content. For example, when the intelligent assistant 130 identifies "Georgia" as an entity, the intelligent assistant 130 will use other text, such as "Appalachian" and "Atlanta" or "Caucasus" and "Tblisi", present in the presentation document to distinguish the entities for the US state or the central-Asian nation respectively.

Proceeding to OPERATION 350, the intelligent assistant 130 consults a persistent store, such as a reference database 140 or a personal data platform 150, with the metrics and the entities to generate one or more feedback items for the presentation. For example, the intelligent assistant 130 may determine based on past speaking rates for the user (from a personal data platform 150) and the general population (from a reference database 140) whether the current speaking rate for a given run of the presentation satisfies an acceptable rate range requirement. In another example, the text converted from speech is analyzed to identify garbled or unintelligible sections to identify areas where the presenter will need to slow down and/or enunciate. In a further example, the text converted from speech is analyzed against a list of words to avoid (e.g., jargon, verbal tics, ambiguous terms) from a persistent store.

At OPERATION 360 the feedback on the presentation document is returned to the client device 110. In various aspects, the feedback may include a command to implement proactively in the presentation software 115, an alert or notification (e.g., an running average of the rate of speech for a given section, a segment is too verbose), or an integration of content (e.g., a new transcript file based on a conversion to speech-to-text, integration of the converted text into notes or comments of the presentation document).

Figure 4A:
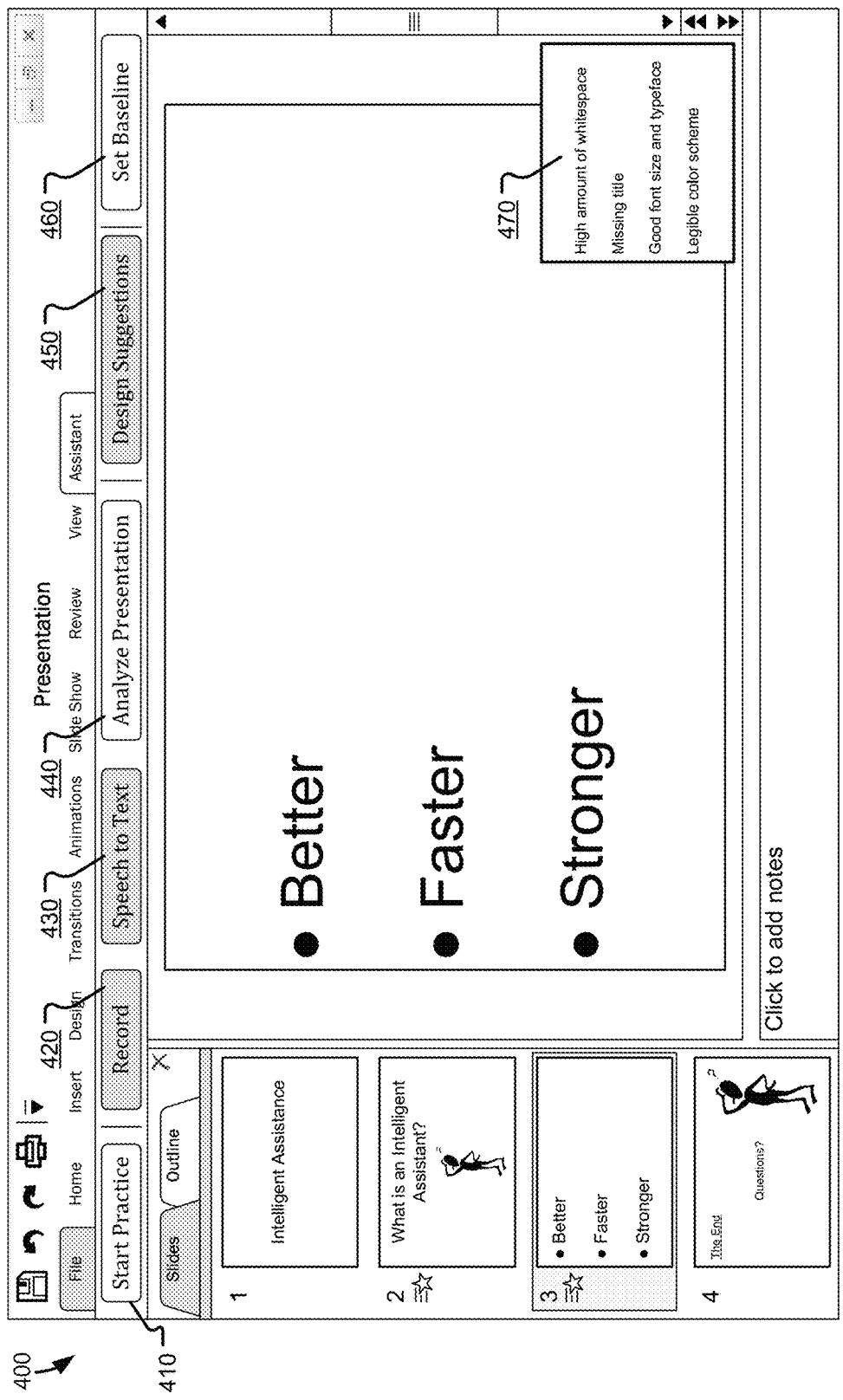
FIGS. 4A and 4B illustrate example user interfaces providing personalized assistance.
Figure 4B:
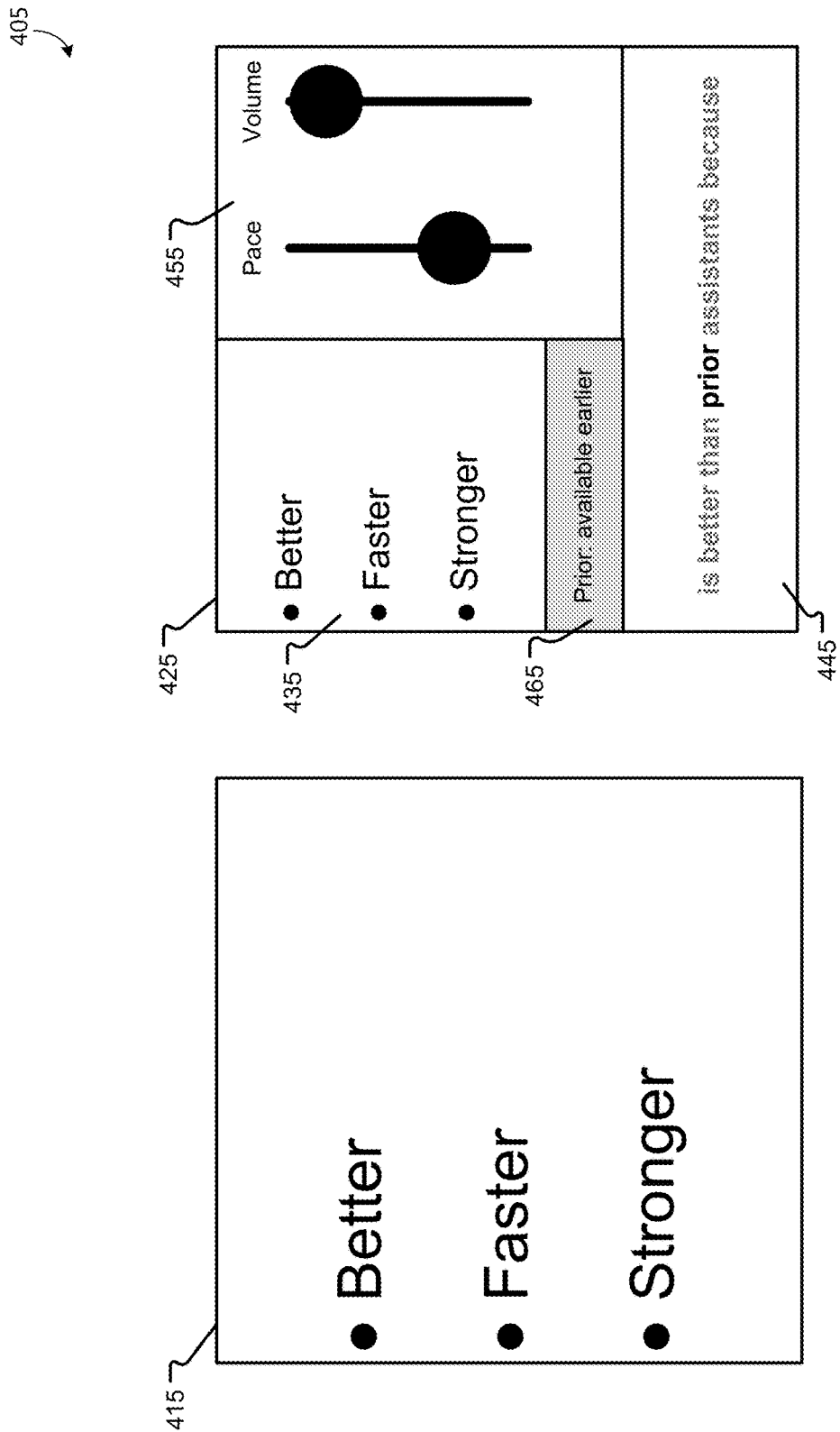

FIGS. 4A and 4B illustrate example user interfaces (UI) providing personalized assistance. As will be appreciated, the organization, aesthetics, and composition of the example features discussed in relation to FIGS. 4A and 4B will vary in different aspects, and the discussions of these feature are provided as non-limiting examples.

FIG. 4A illustrates an example UI 400 for a slide authoring application in an authoring mode. A user while in an authoring mode of a presentation software 115 is provided with various tools to add, remove, organize, and format content as part of a presentation document. In various aspects, a presentation document includes a content section and a notes sections and may be divided into various sections based on the amount of content (e.g., flowing text defining lines and pages), a selected hardcopy size (e.g., a paper size for printing), logical groupings (e.g., slides, canvases, spreadsheets), and character groupings (e.g., paragraphs, line breaks, list entries, words), etc.

As illustrated, several UI elements are provided in the example UI 400 for tools to use an intelligent assistant 130 while authoring a presentation document. As will be appreciated, these UI elements may be provided differently in various UIs to provide more or fewer functionalities of the intelligent assistant 130 in different formats and organizational patterns. Although the UI elements are illustrated as buttons and toggles in FIG. 4A, in other aspects, the intelligent assistant 130 may be invoked automatically as the user authors the presentation document or with controls other than buttons or toggles.

A first UI element for a practice control 410 enables a user to initiate a practice run of the presentation for the intelligent assistant 130 to provide critiques on how the user presents the document. A record control 420 enables the user to specify whether the intelligent assistant 130 should record the audio data from a practice or other run of the presentation for later analysis or inclusion in a notes section or transcript and related options (e.g., whether to save audio data and in what file type, audio compression options, which sound recording device to use).

A speech-to-text control 430 enables the user to specify whether the intelligent assistant 130 is to convert audio data recorded during a practice or live run to text and various options for such a conversion. Options for speech-to-text conversion include, but are not limited to: language, accent, whether to use personal data in converting speech-to-text, whether the text is to be included in a notes section of the presentation document, whether the text is to be included in a new document as a transcript (where that document is to be saved, how it is to be named, etc.), a number of persons presenting (e.g., to identify separate speakers by unique vocal patterns), etc.

An analysis control 440 enables the user to specify the metrics that the user is interested in and how to present those metrics from a live or practice run of the presentation. For example, a user interested in avoiding verbal tics requests that after a presentation run is given, a count of all the verbal tics uttered by the presenter during the run is shown. In another example, a user interested in ensuring an even flow of information during a run requests that volume and rate of speech metrics be provided in a synopsis window after the run. In a further example, a user interested in avoiding jargon terms in the presentation is provided with definitions for the jargon terms from a reference database 140 in a pop-up window when the intelligent assistant 130 determines that technical jargon terms are being used during a run of the presentation.

A design suggestion control 450 is provided to enable the user to receive suggestions on the design of the presentation document from the intelligent assistant 130. For example, suggestions about the verbosity of a given portion or segment of the document, color schemes, content element placement, content element sizing, etc., may be provided based on the current layout of the presentation document. In another example, additional content from the reference database 140 or personalized data platform 150 is provided as a design suggestion by the intelligent assistant 130. For example, a user who has entered content describing the state of Georgia is provided an image of a map of Georgia or a hyperlink to the board of tourism for the state of Georgia from a reference database 140 as design suggestions. In another example, a user authoring content into the presentation document has that content automatically formatted to the user's most frequently used styles (e.g., color, typeface, theme, page size) by the intelligent assistant 130 as a design suggestion based on data from the personalized data platform 150.

In various aspects, a baseline control 460 is provided to enable the user to select which persistent stores are consulted or to manually set preferences for how data and suggestions are to be handled. For example, a user may select one of several languages or accents as a baseline for how the intelligent assistant 130 analyzes speech or text while forming a personalized analysis of the user's speech patterns. In another example, a user may select one or more search engines or search strategies to browse for related content in a persistent store, or may designate various documents (e.g., a style sheet) as having greater or lesser weight when analyzing the persistent stores.

Various metrics about the presentation document or a given run of the presentation are provided in an analysis window 470 depending on the options selected by the user. In various aspects, an analysis window is provided as a frame in the example UI 400 (docked or undocked) a new window (modal or unmodal) and may present data as text suggestions, data graphics (e.g., a color spectrum associated with a given metric), histograms, counts, graphs, etc. In various aspects, the data are related to a given segment of the presentation document or are related to the presentation document as a whole.

FIG. 4B illustrates an example UI 405 for a slide authoring application in a presentation mode. A user while in a presentation mode of a presentation software 115 on a device in communication with more than one viewing apparatus is provided with an audience view 415 and a presenter view 425 with varying information. An audience view 415, which may be shown on a main screen, a projector, or other devices associated with members of an audience, presents the primary content of the presentation document to the audience. A presenter view 425 of the document provides the presenter with additional information about the document and the presentation run that the intelligent assistant 130 is operable to augment. In various aspects, the presenter view 425 is displayed on a secondary monitor, a viewing device local to the presenter in a remote presentation, on a primary viewing device during a practice run of the presentation, or another viewing device that is not shared with the audience.

In the presenter view 425, the presenter is provided with a content preview 435, which in some aspects matches the audience view 415 or may also include additional views of the presentation document (e.g., a next page/slide). The presenter view 425 also includes, in various aspects, a notes section 445 that shows the notes associated with a given segment of the presentation document shown in the audience view 415 to be presented to the presenter. In various aspects, the intelligent assistant 130 provides the notes in the notes section 445 according to a karaoke style that recognizes a pace at which the presenter is discussing (or desires to discuss) the content of the document and the words that the presenter has spoken, and highlights (and/or presents a subset of) the content of the notes section to aid in presenting the material to the audience (e.g., showing each word in a different color/effect as the presenter is to say it).

Ongoing metrics or suggestions are provided by the intelligent assistant 130 to the presenter in the presenter view 425 in a progression section 455. For example, a running average of the pace at which the presenter is speaking, a volume at which the presenter is speaking, a running time (for the presentation document or the segment), a countdown time (for the presentation document or the segment), a word count (specific to particular words or a general count), etc., are provided to let the presenter know how the presentation run in unfolding according to various metrics analyzed by the intelligent assistant 130.

Discrete metrics or suggestions are provided by the intelligent assistant 130 in an alerts window 465 of the presenter view 425. The alerts window 465 provides discrete metrics or suggestions, such as, for example, an alert when a presenter utters a term designated as a verbal tic or jargon, definitions or pronunciation guides for various terms, a suggested segment of the document to proceed to out of order, a long pause alert, connectivity alerts (e.g., a remote audience member has timed out), etc.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
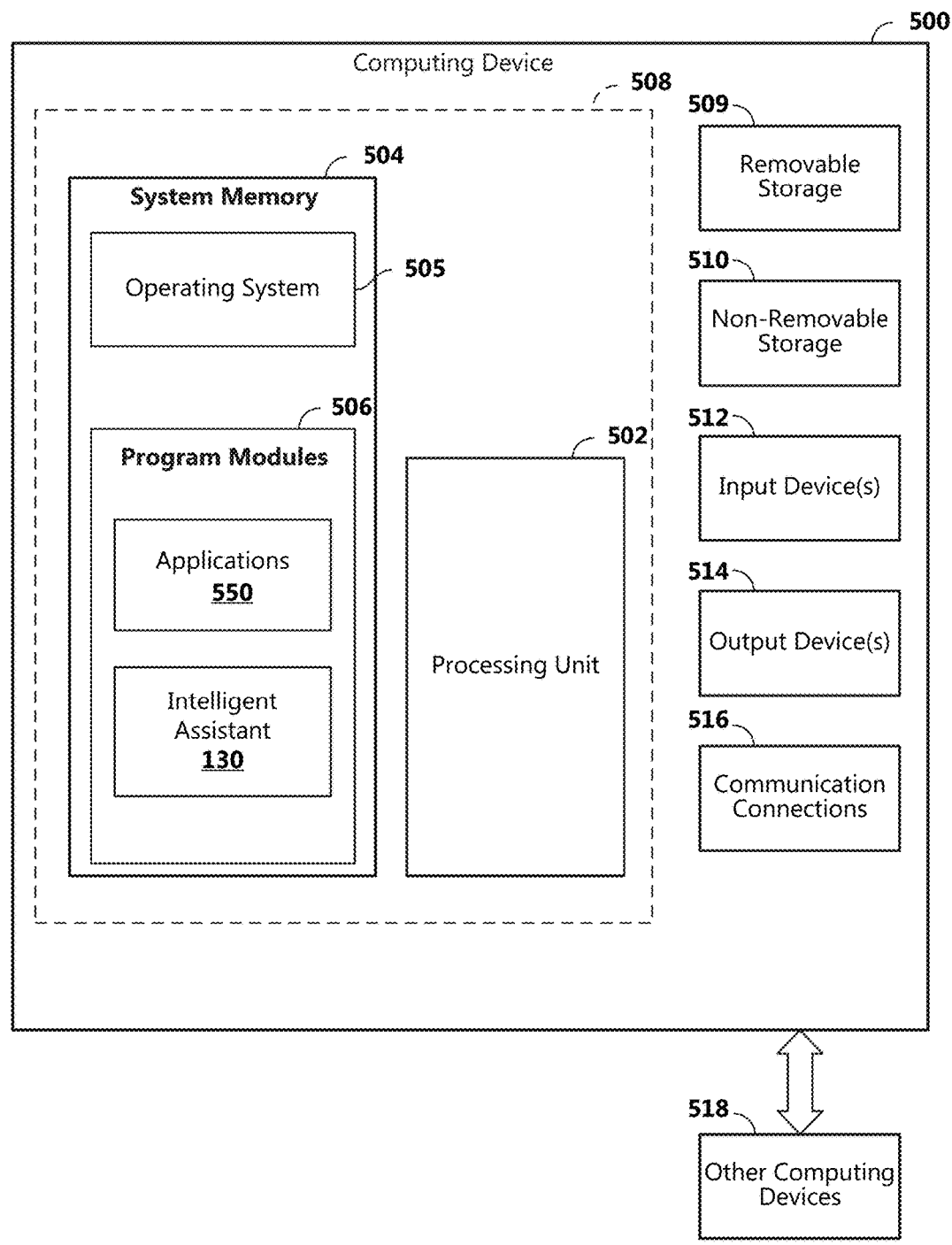
FIG. 5 is a block diagram illustrating example physical components of a computing device.
Figure 6A:
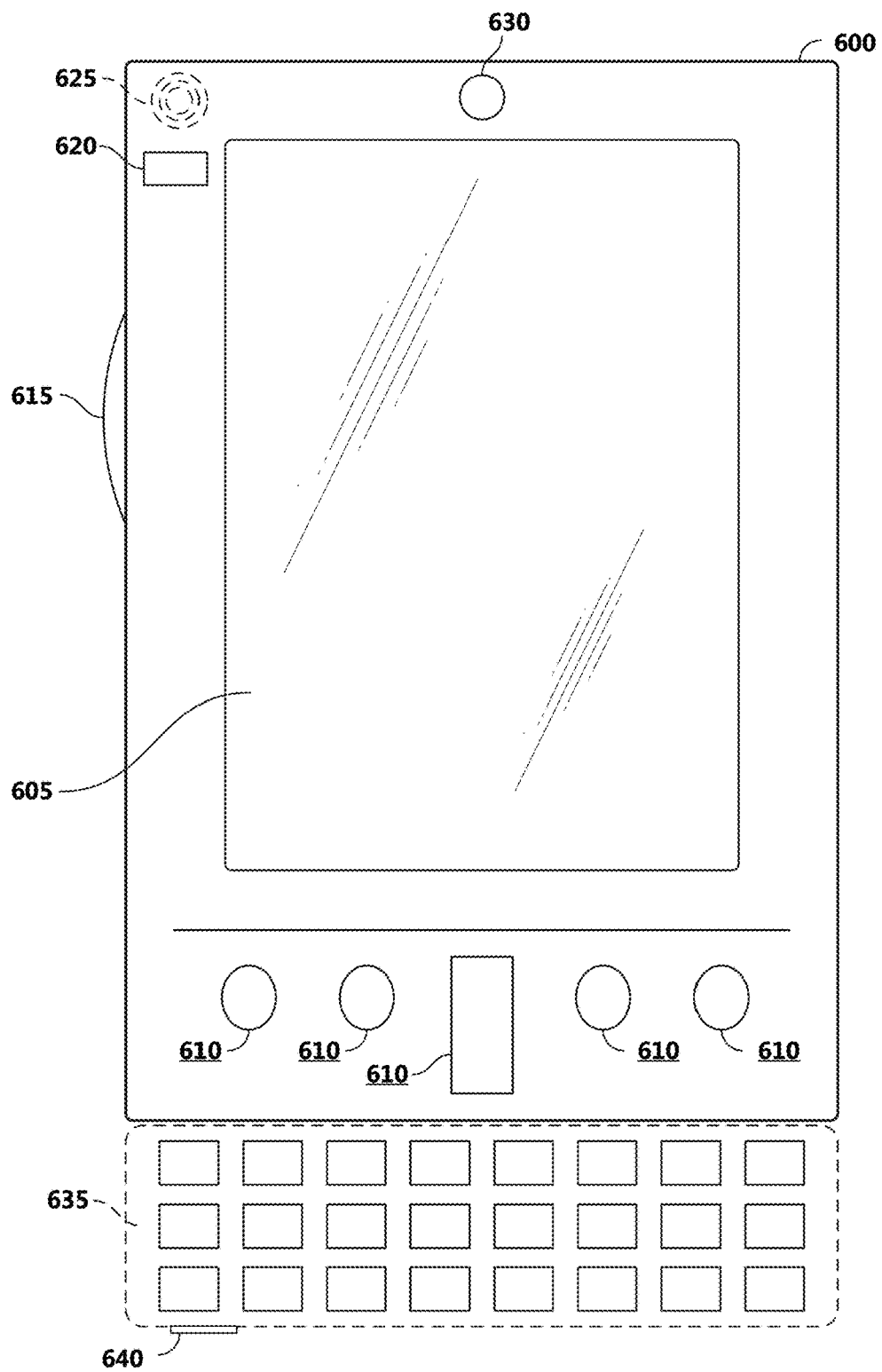
FIGS. 6A and 6B are block diagrams of a mobile computing device.
Figure 6B:
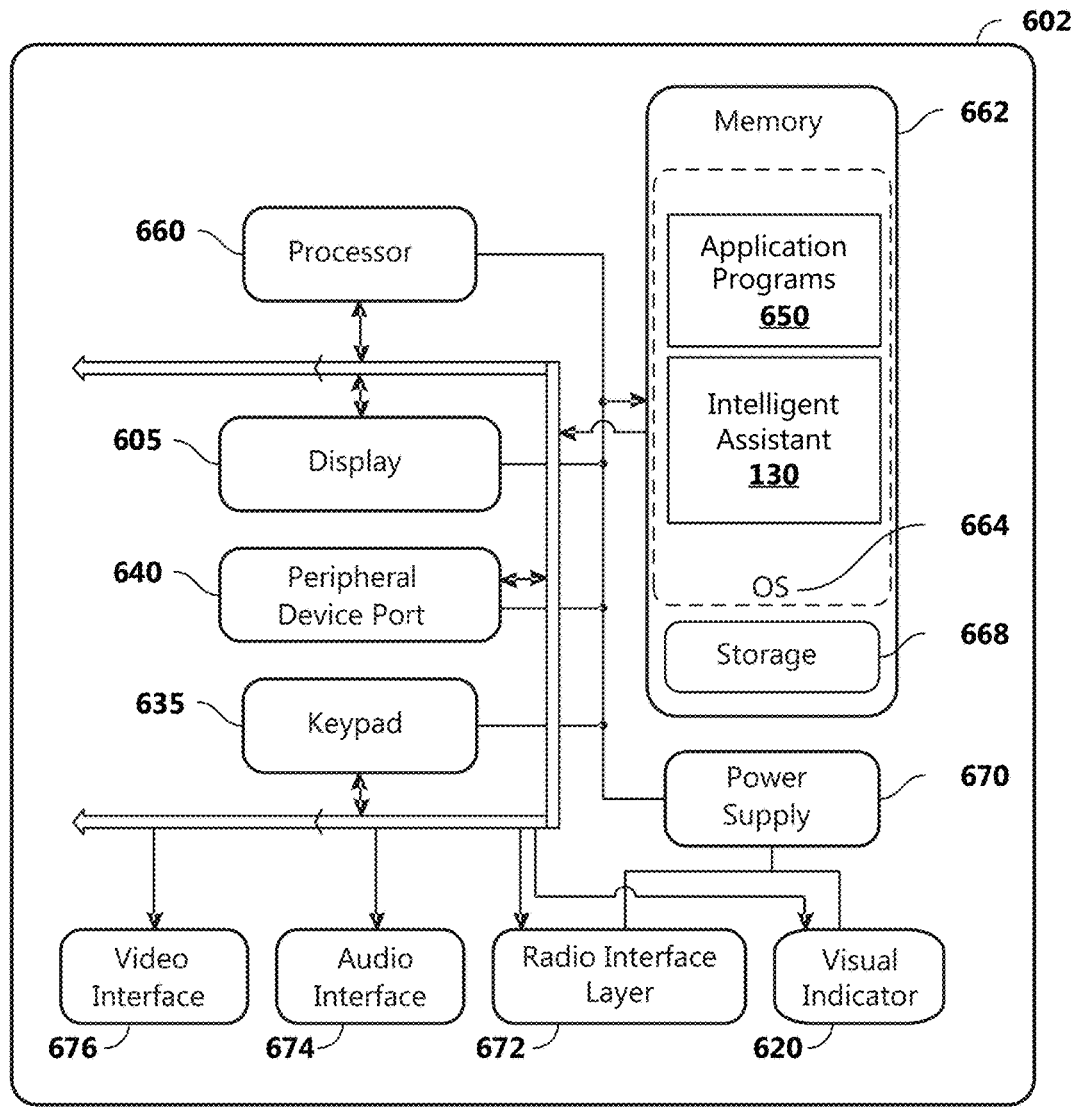
Figure 7:
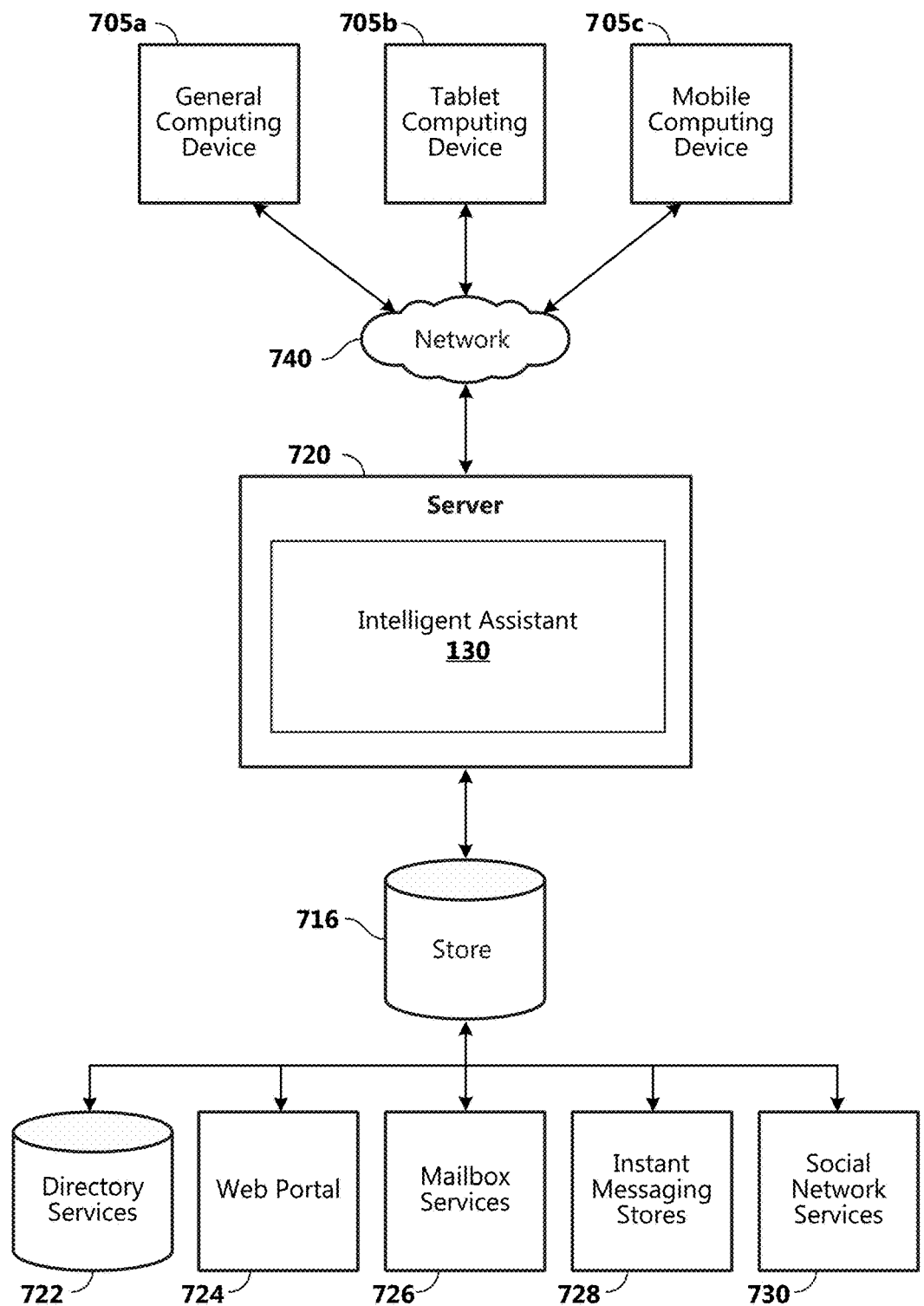
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 4-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes intelligent assistant 130. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., intelligent assistant 130) perform processes including, but not limited to, one or more of the stages of the method 300 illustrated in FIG. 3.

According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the intelligent assistant 130 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system providing personalized assistance in a productivity suite or application as described above. Content developed, interacted with, or edited in association with the intelligent assistant 130 is enabled to be stored in different communication channels or other storage types. For example, various documents may be stored using a directory service 722, a web portal 724, a mailbox service 726, an instant messaging store 728, or a social networking site 730. The intelligent assistant 130 is operative to use any of these types of systems or the like for providing personalized assistance in a productivity suite or application, as described herein. According to an aspect, a server 720 provides the intelligent assistant 130 to clients 705*a,b,c*. As one example, the server 720 is a web server providing the intelligent assistant 130 over the web. The server 720 provides the intelligent assistant 130 over the web to clients 705 through a network 740. By way of example, the client computing device is implemented and embodied in a personal computer 705*a*, a tablet computing device 705*b* or a mobile computing device 705*c* (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for providing personalized assistance in a presentation application of a productivity suite, comprising:
   receiving content related to a prepared presentation from a client device running the presentation application of the productivity suite, the content including both textual content from the prepared presentation and speech content comprising audio data representative of a speaker performing the prepared presentation;
   converting the speech content to converted text;
   identifying one or more speech patterns of the speaker in the speech content or the converted text;
   comparing the identified one or more speech patterns of the speaker to historical speech patterns of the speaker that have been previously stored in a digital data persistent store;
   generating feedback that includes one or more suggestions for modifying the identified speech patterns of the speaker based on the comparison;
   returning the feedback to the client device;
   analyzing the textual content of the prepared presentation to identify searchable entities within the content;
   searching for at least one of the identified searchable entities via a search engine to provide a result from a network or graph database, the result comprising information relevant to the at least one identified searchable identity and usable to augment the prepared presentation; and
   augmenting the prepared presentation with the result.

2. The method of claim 1, further comprising comparing design choices in the prepared presentation to known design choice best practices stored in the persistent store and generating feedback that includes one or more suggestions for modifying one or more of the design choices in the prepared presentation to a best practice design choice.

3. The method of claim 1, wherein the content received is designated as a practice run of the prepared presentation.

4. The method of claim 1, wherein the content received is designated as a live run of the prepared presentation.

5. The method of claim 1, wherein returning the feedback to the client device includes returning the feedback to the client device via a presenter view of the prepared presentation in the presentation application.

6. The method of claim 1, wherein the prepared presentation includes a plurality of sections and wherein the method further comprises:
   comparing the textual content of one the plurality of sections to the textual content of another of the plurality of sections to assess a consistency of verbosity in the plurality of sections; and
   generating feedback that includes one or more suggestions for improving the consistency of verbosity in one or more of the plurality of sections based on the comparison of the textual content.

7. The method of claim 6, wherein returning the feedback to the client device includes returning the feedback to the client device via a presenter view of the prepared presentation in the presentation application.

8. The method of claim 1, wherein the one or more speech patterns include one or more of: language choice, preferred vocabulary, accents, volume, emotional state, pitch, rate, verbal tics, and pauses.

9. The method of claim 1, wherein the result includes a command to implement the result in the prepared presentation.

10. The method of claim 1, further comprising adding context to at least one of identified searchable entities based on contextual content of the prepared presentation.

11. The method of claim 1, wherein analyzing the textual content to identify searchable entities includes inferring an identity based on context of the textual content.

12. The method of claim 1, wherein the method is invoked automatically by the prepared presentation application during authoring of the prepared presentation.

13. The method of claim 1, wherein the result includes a hyperlink to the relevant information.

14. The method of claim 1, wherein the identified searchable entities consist only of proper nouns.

15. A system for providing personalized assistance in a presentation application of a productivity suite, comprising:
   a processor; and
   a storage device including instructions, which when executed by the processor provide an intelligent assistant operable to:
      receive content related to a prepared presentation from a client device running the presentation application of the productivity suite, the content including both textual content from the prepared presentation and speech content comprising audio data representative of a speaker performing the prepared presentation;
      convert the speech content to converted text;
      identify one or more speech patterns of the speaker in the speech content or the converted text;

compare the identified one or more speech patterns of the speaker to historical speech patterns of the speaker that have been previously stored in a digital data persistent store;

generating feedback that includes one or more suggestions for modifying the identified speech patterns of the speaker based on the comparison;

return the feedback to the client device;

analyze the textual content of the prepared presentation to identify searchable entities within the content;

search for at least one of the identified searchable entities via a search engine to provide a result from a network or graph database, the result comprising information relevant to the at least one identified searchable identity and usable to augment the prepared presentation; and augmenting the prepared presentation with the result.

16. The system of claim 15, wherein the intelligent assistant is further operable to identify presenter preferences from personal data in the persistent store; and execute a proactive command in the productivity suite, as part of the feedback, to implement the presenter preferences in the prepared presentation.

17. The system of claim 15, wherein the intelligent assistant is further operable to:

convert the speech content to converted text based on personal data for a presenter stored in the persistent store;

correlate the converted text to the textual content;

incorporate, as part of the feedback, the converted text as notes in the prepared presentation; and update the personal data according to a machine learning framework based on the speech content and corrections to the converted text received from the client device.

18. The system of claim 15, wherein the intelligent assistant is further operable to:

identify an emotion of a presenter uttering the speech content based on personal data stored in the persistent store, a tone of the speech content, a rate of the speech content, and a pitch of the speech content.

19. The system of claim 15, wherein the prepared presentation includes a plurality of sections and wherein the intelligent assistant is further operable to:

compare the textual content of one the plurality of sections to the textual content of another of the plurality of sections to assess a consistency of verbosity in in the plurality of sections; and generate feedback that includes one or more suggestions for improving the consistency of verbosity in one or more of the plurality of sections based on the comparison of the textual content.

20. A computer readable storage device including instructions to provide an intelligent assistant for providing personalized assistance in presentation application of a productivity suite, comprising:

receiving content related to a prepared presentation from a client device running the presentation application of the productivity suite, the content including textual content from the prepared presentation and speech content comprising audio data representative of a speaker performing the prepared presentation;

converting the speech content to converted text;

identifying one or more speech patterns of the speaker in the speech content or in the converted text;

comparing the identified one or more speech patterns of the speaker to historical speech patterns of the speaker that have been previously stored in a digital data persistent store;

generating feedback that includes one or more suggestions for modifying the identified speech patterns of the speaker based on the comparison;

monitoring a word rate of the speech content;

returning the feedback to the client device, within a presenter view of the prepared presentation in the presentation application;

analyzing the textual content of the prepared presentation to identify searchable entities within the content;

searching for at least one of the identified searchable entities via a search engine to provide a result from a network or graph database, the result comprising information relevant to the at least one identified searchable identity and usable to augment the prepared presentation; and augmenting the prepared presentation with the result.

21. The computer readable storage device of claim 20, wherein the content received during a designated practice run of the prepared presentation;

wherein the feedback includes incorporating the converted textual content in a notes segment of the prepared presentation.

22. The computer readable storage device of claim 20, wherein the content is received during a designated live run of the prepared presentation.

* * * * *